United States P
Johnson

3,759,605
Sept. 18, 1973

[54] METHOD AND APPARATUS FOR HOUSING UNDERWATER OPTICAL INSTRUMENTS

[76] Inventor: Quentin S. Johnson, 703 W. Mettletree Rd., Sterling, Va. 22170

[22] Filed: Oct. 29, 1971

[21] Appl. No.: 193,903

[52] U.S. Cl. .................. 350/179, 95/11 W, 350/61
[51] Int. Cl. ........................................ G02b 27/00
[58] Field of Search .................. 350/179, 180, 61; 95/11 W

[56] References Cited
UNITED STATES PATENTS

| | | | |
|---|---|---|---|
| 3,320,018 | 5/1967 | Pepke | 350/179 UX |
| 1,968,267 | 7/1934 | Straubel | 350/179 X |

*Primary Examiner*—John K. Corbin
*Attorney*—Joseph M. Lane et al.

[57] ABSTRACT

An underwater optical method and apparatus in which the pressure within a sealed optical chamber is balanced with external hydrostatic pressure by filling the optical compartment with a pressurized gas having a minimum index of refraction. The focal length of a lens within the optical compartment remains nearly constant throughout a range of changing internal pressure because of the low index of refraction of the gas (typically helium) as compared with other gases. The low-index gas is supplied from a pressurized gas bottle carried by the device.

6 Claims, 3 Drawing Figures

PATENTED SEP 18 1973　　3,759,605

INVENTOR
QUENTIN S. JOHNSON

BY Lane, Aiken, Dunner & Ziems
ATTORNEYS

METHOD AND APPARATUS FOR HOUSING UNDERWATER OPTICAL INSTRUMENTS

BACKGROUND OF THE INVENTION

This invention relates to underwater optical apparatus and methods and more particularly, it concerns a unique method and apparatus by which the focal length of a lens, such as a camera lens, may be retained nearly constant in an atmosphere subjected to extreme pressure variations such as those experienced in pressure-balanced protective housings used in underwater photography down to 35,000 feet and greater submergence depths.

Protective housings for underwater cameras and other optical instruments such as telescopes, periscopes and the like have in the past employed pressure balancing devices such as diaphragms, bellows or flexible bags by which an hermetically sealed interior space or chamber containing the optical instrument in maintained at a pressure essentially the same as the hydrostatic pressure existing at the depth to which the housing is lowered. By maintaining such a balance of internal and external pressures, the walls of the housing obviously may be constructed of thinner and thus less expensive materials and perhaps more importantly, the problems associated with seals between the walls and light transmitting windows or access openings are significantly reduced as compared with housings designed to resist the pressure of water by wall and seal strengths alone. While such devices have been satisfactorily used in the employment of conventional optical instruments at relatively shallow depths (on the order of those accessible to a skindiver, for example) numerous problems are presented to the effective use of pressure compensated housings of the type heretofore available at depths where hydrostatic pressure reaches a magnitude on the order of 1,000 atmospheres.

Perhaps the most serious of these problems is as a result of the change in the index of refraction which occurs in a gaseous medium as it is subjected to variable pressures. Because the focal length of a simple lens is as a result of the change in the index of refraction at the interface of the lens material (e.g., glass) and the surrounding medium, a change in the index of refraction of a gaseous surrounding medium due to pressure variation will bring about a change in the focal length of the lens. Obviously where the change is severe, such as that incurred in the index of refraction of air undergoing a pressure variation of from one to 1,000 atmospheres, the lens system of the optical instrument such as a camera must be shifted in position with respect to the image plane or unsatisfactory results will obtain. The amount of shifting required in each case varies directly with the change in pressure and with the index of refraction of the gas employed.

In addition to the change in the index of refraction of a gas with variations in pressure being much higher in air than in, for example, helium, the use of air as a gaseous medium surrounding an optical instrument, though acceptable at relatively shallow depths, becomes unacceptable at the high pressures associated with at greater depths of the type contemplated by the present invention. For example, the oxygen in air compressed to such pressures as, for example, 1,000 atmospheres becomes more chemically reactive and is thus more likely to oxidize various of the materials used in both the optical device and the housing defining the chamber within which the device is located.

Attempts have been made in the prior art to overcome the optical deficiencies of a gaseous medium in underwater camera housings by using an incompressible gelatin or liquid medium. See for example U.S. Pat. No. 3,236,167. While this solution to the problem is acceptable in some applications, it poses other problems such as the requirement for specially designed optical instruments. Moreover, because the index of refraction of almost all known solids or liquids is much higher than that of the average gas, the focal lengths of lenses become so much longer and the resultant lenses require so much more space that these systems are in most cases impracticable.

SUMMARY OF THE INVENTION

In accordance with the present invention, an improved method and apparatus is provided by which conventional optical instruments may be submerged in a housing having a facility for balancing internal and external pressures to depths at which hydrostatic pressures exceed 1,000 atmospheres without significant loss of optical efficiency. Essentially, the optical instrument, such as a camera, is mounted in a sealed chamber defined by the housing which is provided with means for the transmission of exterior light to the lens of the camera or other optical instrument. The housing interior is then filled with an inert gas having a low index of refraction, typically helium gas, and the gas is maintained under a pressure substantially equal to the hydrostatic pressure existing at the depth to which the instrument within the housing is submerged. In a preferred embodiment of the apparatus by which the invention is practiced, the gas of choice is helium, which is contained in a high pressure vessel in sufficient volume and pressure to balance the maximum hydrostatic pressure anticipated. The vessel is loaded into the interior space of the housing along with the camera or other optical instrument to be used. The high pressure vessel is provided with an expansion valve coupled with a pressure differential sensing means such as a diaphragm in a wall of the external housing so that gas will be emitted from the high pressure vessel as needed to balance substantially the interior pressure of the housing with the exterior hydrostatic pressure. A check valve is provided by which excessive pressures within the housing may be vented to maintain the interior-exterior pressure balance when the exterior hydrostatic pressure is being reduced, such as for example, during raising the submerged housing.

Among the objects of the present invention therefore are: the provision of an improved method and apparatus for submerging optical instruments, such as for example cameras, by which the focal length of the optical section of such instrument is maintained at a substantially constant value; the provision of such a method and apparatus which facilitates the use of conventional optical instruments; the provision of such a method and apparatus which is simple and uncomplicated as well as offering a facility for compactness of size; and the provision of an improved method and apparatus of the type referred to by which the problems heretofore experienced within the submergence of optical instruments at extreme depths are substantially alleviated.

DETAILED DESCRIPTION OF THE PREFERRED EMBODIMENT

Figure 1:
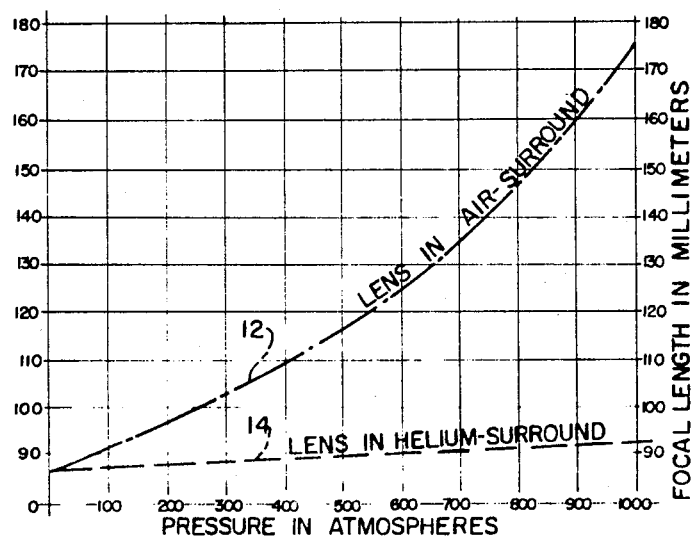
FIG. 1 is a graph showing two curves resulting from plotting focal length against pressure of a lens in air and a lens in helium respectively.
Figure 2:
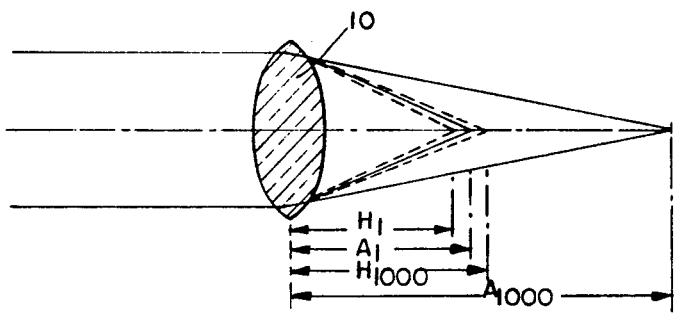
FIG. 2 is a schematic drawing depicting the variation in focal lengths of a lens in different gaseous mediums under varying pressures.

To provide a full understanding of the principles underlying the present invention, reference is first made to FIGS. 1 and 2 of the drawings which illustrate graphically the manner in which the focal length of a simple biconvex lens 10 is affected by pressure variations in the gas surrounding the lens. The curves 12 and 14 in FIG. 1 were plotted by calculating the focal lenths of the lens 10 assuming the radii of the opposed convex surfaces both equal to 100 mm. and that the lens 10 is formed of a barium flint having an index of refraction of 1.5740 at atmospheric pressure and of 1.5760 at 1,000 atmospheres of pressure. The two gases selected for purposes of comparison were air (curve 12) which has an index of refraction of 1.0002926 at atmospheric pressure and helium (curve 14) which has an index of refraction of 1.0000360 at one atmosphere of pressure. Since the index of refraction of a gas, referenced to a vacuum, varies directly with pressure, it will be seen that the index of refraction for air at 1,000 atmospheres will be approximately 1.292600 whereas the index of refraction for helium at that pressure will be 1.036000. Because of the relatively low index of refraction of helium, the change in the focal length of the lens 10 resulting from a pressure increase of from one to 1,000 atmospheres varies from 87.1 mm. to 92.6 mm. or a change of approximately 6 percent whereas the corresponding focal lengths where the gas surrounding the lens is air changes from 87.2 mm. at one atmosphere to 176.4 mm. at 1,000 atmospheres, a change of 102 percent. The curves 12 and 14 illustrate the variations of lens focal length for pressures within the 1,000 atmosphere range of these calculations.

The variation of lens focal lengths over the range of pressure changes for which the curves 12 and 14 are plotted in FIG. 1 is illustrated further in FIG. 2 of the drawings. Specifically, the focal length of the lens 10 in helium at one atmosphere is represented by the dimension $H_1$ whereas the focal length in helium at 1,000 atmospheres is designated by the dimension $H_{1,000}$. Where the surrounding gas is air, the focal length of the lens at one atmosphere is represented by the dimension $A_1$ whereas the dimension $A_{1,000}$ depicts the focal length where the lens is surrounded by air under a pressure of 1,000 atmospheres. Thus it will be seen that the focal length variation from $H_1$ to $H_{1,000}$ is relatively insignificant as compared with the focal length variation between $A_1$ and $A_{1,000}$.

Figure 3:
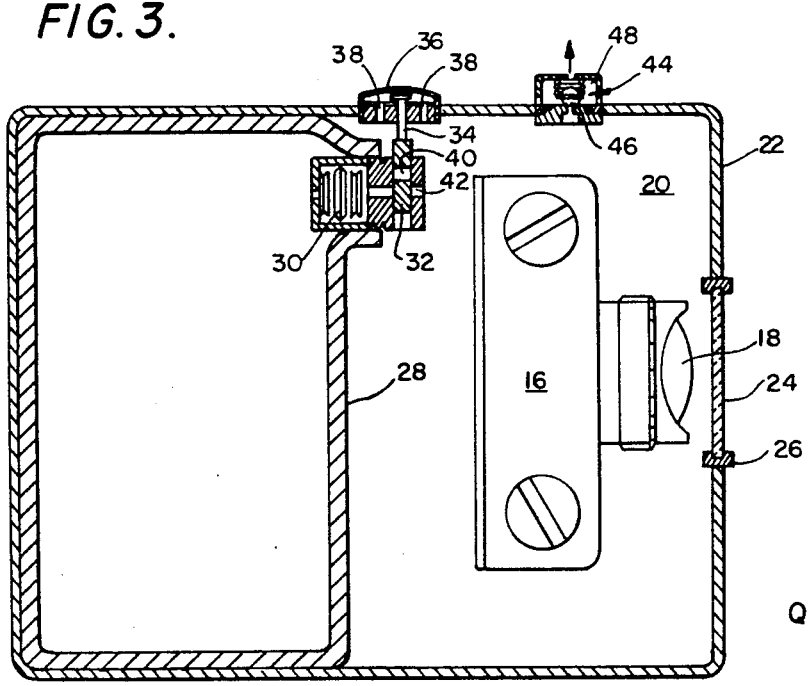
FIG. 3 is a cross-section through the optical instrument housing of an embodiment of this invention in which a photographic camera is mounted.

The apparatus by which the present invention is practiced is illustrated in FIG. 3 of the drawings. As shown, a conventional camera 16 having an objective lens 18 is supported by suitable means (not shown) within an optical chamber 20 established by a relatively thin walled housing 22. The housing 22 is provided with a transparent port or window 24 secured by an appropriate seal 26. As shown, the camera 16 is arranged within the chamber 20 so that its optical axis is aligned with the window 24 to enable the exposure of film within the camera to an image located outside of the housing 22.

The camera 16 is selected as an example of an optical instrument with which the present invention may be used and is conventional in all respects. Though not shown in the drawings, it is apparent that appropriate remote control means will be required for the camera, such as a line associated with a cable (also not shown) by which the housing may be supported at desired underwater depths from a vessel on the surface.

To supply an atmosphere of helium within the optical chamber 20 at pressures substantially equal to the hydrostatic pressure existing at the depth to which the housing 22 is lowered, a high pressure gas vessel 28 is also supported within the housing 22. The gas vessel 28 is equipped with an expansion valve 30 and a release valve 32. The release valve 32 is connected by a stem 34 to a pressure equalizing diaphragm 36 on the exterior of the housing 22 and exposed to pressure within the optical chamber 20 through ports 38. Though the valve 32 is shown in the closed position in FIG. 3 it will be appreciated that an increase in external pressure will move the valve 32 downwardly so that a port 40 therein becomes aligned with an outlet port 42 of the expansion valve 30.

Because the gas stored within the pressure vessel 28 constitutes the sole source of gas for balancing external hydrostatic pressures, it is contemplated that the pressure vessel 28 will be loaded with helium gas under an internal pressure at least equal to the maximum hydrostatic pressure to which the housing 22 is to be exposed plus an additional increment of pressure to compensate for the ratio of the volume of the optical compartment 20 to the volume of the pressure vessel 28.

A check valve 44 is located in the wall of the housing 22 to permit the escape of gas from the optical chamber 20 to the exterior of the housing. In the embodiment shown, the check valve 44 includes a conventional ball plug 46 biased to its seated position by compression spring 48. It is contemplated that the spring 48 will allow the ball 46 to open or unseat when the pressure within the optical compartment exceeds external hydrostatic by approximately two pounds per square inch.

In operation, the camera 16, loaded with film is placed within the housing 22 and the optical chamber 20 therein purged of air by manually depressing the diaphragm 36 until the chamber is filled with helium gas initially contained within the pressure vessel 28. Thereafter, the housing is lowered underwater to the depth at which it is desired to operate the camera. As the housing descends in the water and is subjected to increased hydrostatic pressures, the diaphragm 36 will operate the release valve 32 to permit the escape of helium at high pressure from the pressure vessel 28 into the optical chamber 20. When the housing is elevated underwater, such that the pressure of gas in the optical chamber 20 exceeds exterior hydrostatic pressure, the check valve 44 will operate allowing the escape of gas from the chamber 20. Because the entire optical instrument, the camera 16 in the illustrated embodiment, is located within the inert helium atmosphere, all portions of the camera are exposed to the same pressure. As a result, the camera is not subjected in any way to physical strain which might bring about distortion in its optical system.

Thus it will be seen that the present invention provides a highly effective method and apparatus for the employment of conventional optical instruments at great depths underwater and by which the above mentioned objectives are fulfilled. It is also apparent that numerous modifications and/or variations in the described embodiment can be made without departing from the true spirit and scope of the invention. It is expressly intended, therefore, that the foregoing description is illustrative of preferred embodiment only, not limiting, and that the true spirit and scope of the present invention will be determined by reference to the appended claims.

I claim:

1. The method of submerging for underwater use, an optical instrument having a lens, said method comprising steps of: locating said instrument in a sealed enclosure having means for transmitting light from the exterior of said housing to the lens of said instrument; filling said enclosure with helium, thereby to provide in said enclosure a gaseous medium which has a substantially constant low index of refraction and which is inert at varying pressure up to approximately 1,000 atmospheres; and maintaining said helium under pressure substantially equal to the the hydrostatic pressure existing at the depth to which said housing is submerged.

2. Apparatus for adapting optical instruments to underwater use comprising: an hermetically sealed housing having walls to establish a chamber for an optical instrument; means establishing a pressurized source of helium; and means to transfer said helium from said pressurized source to said chamber in amounts to balance the internal pressure of said housing with the external hydrostatic pressure existing at the depth to which said housing is submerged, thereby to provide in said chamber a gaseous medium which is inert and which has a substantially constant low index of refraction at varying pressures up to approximately 1,000 atmospheres.

3. The apparatus recited in claim 2 wherein said means establishing said pressurized source of gas is contained within said housing.

4. The apparatus recited in claim 3 wherein said means transfer said gas from said pressurized source comprises a valve for controlling the release of said gas from said pressurized source; and diaphragm means in a wall of said housing for controlling said valve.

5. The apparatus recited in claim 2 including further a venting valve in said housing for releasing pressurized gas from said chamber when the pressure within said housing exceeds hydrostatic pressure surrounding said housing.

6. The apparatus recited in claim 2 wherein said housing includes means for transmitting light through said housing to the optical instrument located in said chamber.

* * * * *